United States Patent
Madiraju et al.

(10) Patent No.: US 11,182,275 B1
(45) Date of Patent: Nov. 23, 2021

(54) SYSTEMS AND METHOD FOR TESTING COMPUTING ENVIRONMENTS

(71) Applicant: Capital One Services, LLC, McLean, VA (US)

(72) Inventors: Raghuram Madiraju, Frisco, TX (US); Palak Mathur, Celina, TX (US); Maz Jawed Baig, Plano, TX (US); Devi Kiran Gonuguntla, Flower Mound, TX (US); Ajmal Karuthakantakath, Flower Mound, TX (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 17/078,685

(22) Filed: Oct. 23, 2020

(51) Int. Cl.
*G06F 11/36* (2006.01)
*G06F 9/54* (2006.01)

(52) U.S. Cl.
CPC ............ *G06F 11/3676* (2013.01); *G06F 9/54* (2013.01); *G06F 11/368* (2013.01); *G06F 11/3664* (2013.01); *G06F 11/3688* (2013.01)

(58) Field of Classification Search
None
See application file for complete search history.

(56) References Cited

U.S. PATENT DOCUMENTS

| | | | |
|---|---|---|---|
| 8,862,950 B1 * | 10/2014 | Ginsberg | G06F 11/3688 714/57 |
| 10,007,597 B2 | 6/2018 | Barnett et al. | |
| 10,261,891 B2 | 4/2019 | Rajagopalan et al. | |
| 10,318,412 B1 * | 6/2019 | McKearney, Jr. | .. G06F 11/3684 |
| 10,379,995 B1 | 8/2019 | Walters et al. | |
| 10,496,532 B1 * | 12/2019 | Kaitha | ................ G06F 11/3419 |
| 10,963,435 B1 * | 3/2021 | McAlister | ........... G06F 11/0766 |
| 2012/0030172 A1 * | 2/2012 | Pareek | ................. G06F 16/275 707/635 |

(Continued)

OTHER PUBLICATIONS

Denny, I. P. M. Atmaja, A. Saptawijaya and S. Aminah, "Implementation of change data capture in ETL process for data warehouse using HDFS and apache spark," 2017 International Workshop on Big Data and Information Security (IWBIS), 2017, pp. 49-55, doi: 10.1109/IWBIS.2017.8275102. (Year: 2017).*

(Continued)

*Primary Examiner* — Andrew M. Lyons
(74) *Attorney, Agent, or Firm* — Sterne, Kessler, Goldstein & Fox P.L.L.C.

(57) ABSTRACT

Systems and methods are disclosed herein for improving data migration operations including testing and setup of computing environments. In one example, the method may include receiving data for one or more application programming interfaces (APIs). The method may further include generating one or more tests to test the one or more APIs in a first computing environment, testing the APIs, storing the results in a database, and performing a change data capture operation. The method may further include augmenting the one or more tests with the CDC data to generate an updated test. The method may further include testing, using the updated test, a second set of the one or more APIs and comparing the test results. The method may also include outputting a confidence score indicating a correlation between the first environment and the second environment.

20 Claims, 5 Drawing Sheets

(56) References Cited

U.S. PATENT DOCUMENTS

| | | | |
|---|---|---|---|
| 2015/0317235 A1* | 11/2015 | Lachambre | G06F 11/3664 |
| | | | 717/126 |
| 2018/0285099 A1* | 10/2018 | Mandava | G06F 8/76 |
| 2019/0065351 A1* | 2/2019 | Rakhmilevich | G06F 11/3688 |
| 2019/0235990 A1* | 8/2019 | Lachambre | G06F 8/70 |
| 2020/0110696 A1* | 4/2020 | Liegard | G06F 11/3688 |
| 2020/0218533 A1* | 7/2020 | Sharma | G06F 11/3624 |
| 2020/0326913 A1* | 10/2020 | Ying | G06N 20/00 |
| 2021/0081304 A1* | 3/2021 | Masis | G06F 11/3688 |
| 2021/0173767 A1* | 6/2021 | Zhang | G06F 9/466 |

OTHER PUBLICATIONS

Kalske, Milka, "Transforming monolithic architecture towards microservice architecture," M.Sc. Thesis, University of Helsinki, 2017, pp. 1-72.

Ceeli, Yvonne, "Strangling a Monolith With the Axon Server", Available from the Internet at https://dzone.com/articles/strangling-a-monolith-with-axon-server, Mar. 28, 2019, pp. 1-3.

\* cited by examiner

SYSTEMS AND METHOD FOR TESTING COMPUTING ENVIRONMENTS

BACKGROUND

Software testing is the process of verifying and validating that a computer-based system works as expected and meets user needs. Test cases may be written to test a specific piece of software. The test cases may be used throughout development to test for desired functionality. The test cases may also be used for validation testing of changes. However, a substantial portion of activities in the testing lifecycle are manual, time intensive activities.

Moreover, examples of changes that require testing may include data migration operations for computing environments that house data repositories providing data streams to application program interfaces (APIs). Extensive testing is required to determine if the APIs will operate properly in their new computing environments.

DETAILED DESCRIPTION

To solve the existing problems in the art, the present embodiments deploy automated testing of computing environments to ensure that APIs function properly in new computing environments after data migration is performed. The described testing methodology increases accuracy and speed in deployment and transition of software tools to new computing environments. The testing may also have agnostic qualities, meaning that the testing can be utilized for any type of application. According to some embodiments, the testing may also have evolutionary qualities, where tests are routinely augmented with updated environmental parameters detected in previous test iterations.

Examples of applications for the below methods, media, and systems are numerous, but a few are given here merely to indicate possible uses. Other applications will be readily apparent to one of skill in the relevant arts and are likewise contemplated by this disclosure. Moreover, description of "an embodiment" or "one embodiment" should not be construed as limiting the scope of the disclosure, as elements, sub-elements and features of a given embodiment may also be used in other embodiments of the disclosure. While methods described herein may have steps described in a specified order, it will be understood that some of those steps may be re-arranged or performed in a different order. Additionally, embodiments may be given describing applications to particular industries or commercial fields, but scope of the disclosure is not so limited.

Descriptions are given with reference to the figures included herein. When possible and for clarity, reference numbers are kept consistent from figure to figure. Some of the figures are simplified diagrams, which are not to be interpreted as drawn to scale or spatially limiting for the described embodiments. Where appropriate, the particular perspective or orientation of a figure will be given to increase understanding of the depicted features.

Figure 1:
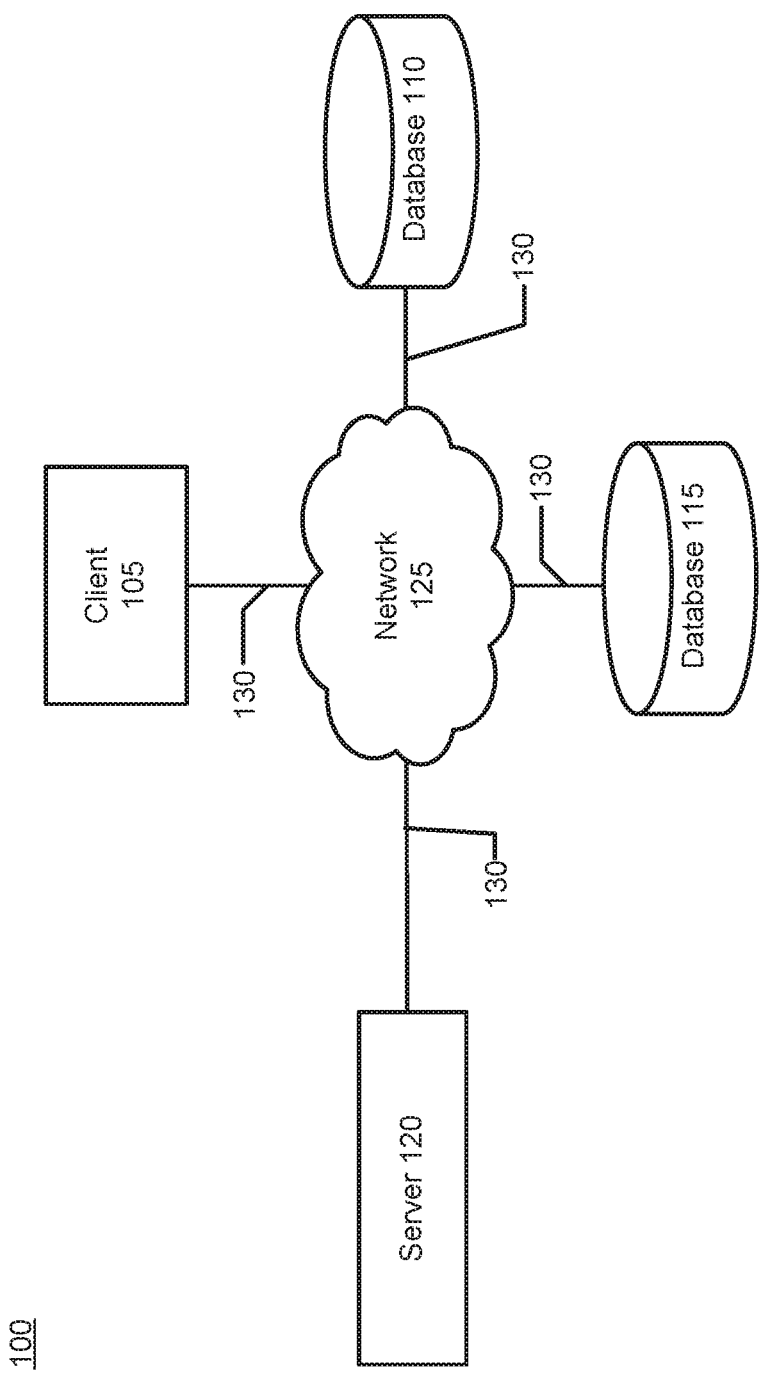
FIG. 1 is a simplified block diagram of a distributed computer network of a system for monitoring, evaluating, and testing data migration operations, according to some embodiments.

FIG. 1 is a simplified block diagram of a distributed computer network 100 of a system for monitoring, evaluating, and testing data migration operations from one computing environment (e.g., database 110) to another computing environment (e.g., database 115), using the below-described testing methodologies, according to some embodiments. Computer network 100 may include a number of client systems 105, a number of database systems (e.g., database 110, database 115), and a server system 120 coupled to a communication network 125 via a plurality of communication links 130. Communication network 125 provides a mechanism for allowing the various components of distributed network 100 to communicate and exchange information with each other.

Communication network 125 may itself include many interconnected computer systems and communication links. Communication links 130 may be hardwire links, optical links, satellite or other wireless communications links, wave propagation links, or any other mechanisms for communication of information. Various communication protocols may be used to facilitate communication between the various systems shown in FIG. 1. These communication protocols may include TCP/IP, HTTP protocols, wireless application protocol (WAP), vendor-specific protocols, customized protocols, Internet telephony, IP telephony, digital voice, voice over broadband (VoBB), broadband telephony, Voice over IP (VoIP), public switched telephone network (PSTN), and others. While in one embodiment, communication network 125 is the Internet, in other embodiments, communication network 125 may be any suitable communication network including a local area network (LAN), a wide area network (WAN), a wireless network, an intranet, a private network, a public network, a switched network, and combinations of these, and the like. Such configuration can enable local and remote data migration management and testing.

Distributed computer network 100 in FIG. 1 is merely illustrative of an embodiment and does not limit the scope of the systems and methods as recited in the claims. One of ordinary skill in the art would recognize other variations, modifications, and alternatives. For example, more than one server system 120 may be connected to communication network 125. As another example, a number of client systems 105 and databases 110 may be coupled to communication network 125 via an access provider (not shown) or via some other server system.

Client system 105 may request information from a server system which provides the information. Server systems, by definition, typically have more computing and storage capacity than client systems. However, a particular computer system may act as either a client or a server depending on whether the computer system is requesting or providing information. Aspects of the system may be embodied using a client-server environment or a cloud computing environment.

In one example, server system 120 receives information requests from client system 105, performs processing required to satisfy the requests, and forwards the results corresponding to the requests back to the requesting client system. This may include performing functions through an application program interface (API) using various API calls. An application programing interface may be a computing interface to a software component or a system that defines how other components or systems can use it. An API may define the kinds of calls or requests that can be made, how to make them, the data formats that should be used, the conventions to follow, etc. An API can also provide extension mechanisms so that users can extend existing functionality in various ways and to varying degrees. An API can be entirely custom, specific to a component, or it can be designed based on an industry standard to ensure interoperability. Some APIs have to be documented; others are designed so that they can be "interrogated" to determine supported functionality. Since other components/systems rely only on the API, the system that provides the API can (ideally) change its internal details "behind" that API without affecting its users.

APIs can use and be related to different software libraries and frameworks that control the program flow, behavior, and processing of calls. As such, APIs can perform differently under different computing environments, where, for example, a data migration operation may take place. According to some aspects, data migration, e.g., migration from database 110 to database 115, may be a process of selecting, preparing, extracting, and transforming data, and permanently transferring it from one computing environment to another.

There may be different types of migrations performed for different reasons. In some aspects, these may include storage migration, database migration, application migration and business process migration. A business may choose to conserve the physical media to take advantage of more efficient storage technologies. This may result in having to move blocks of data from one storage to another, using virtualization techniques. The data format and content itself may not usually be changed in the process and can normally be achieved with minimal or no impact to the data format.

According to some aspects, database migration, also referred to as schema migration, relates to moving data from one database to another. In some aspects, it may be necessary to move from one database vendor to another, or to upgrade the version of database software being used. The latter case is less likely to require a data migration, but this can happen with major upgrades. In these cases a transformation process may be required since the underlying data format can change significantly. This may affect behavior in the application layer, depending largely on whether the data manipulation language or protocol has changed. This further necessitates the need for testing and ensuring that APIs perform as intended when a migration operation from, e.g., database 110 to database 115 takes place.

An application may be made agnostic to the environment in which it operates. For example, this leads to a situation where a change/migration from Sybase, MySQL, DB2 or SQL Server to another environment, e.g., Oracle, may reduce the number of testing cycles required to gain a high confidence level in the migration. For example, an agnostic application may require fewer cycles to meet the confidence level required for successful migration. According to some embodiments, testing may also be agnostic to the database and the application such that, irrespective of the agnostic rating of the application, the testing can be performed.

According to some aspects, enterprises may carry on application migration operations. Such application migration operations may involve changing an application vendor, changing to a new customer relationship management (CRM), or changing to a new enterprise resource planning (ERP) platform.

Other migration types may include business process migration. Business processes may operate through a combination of human and application systems actions, often orchestrated by business process management tools. When these change they can require the movement of data from one store, database, or application to another to reflect the changes to the organization and information about customers, products, and operations. Examples of such migration drivers may include mergers and acquisitions, business optimization, and reorganization to attack new markets or respond to competitive threat.

According to some aspects, server system 120 may manage a data migration operation from database 110 to database 115 for example, while ensuring that all data and applications perform seamlessly for client 105. Some example client systems include desktop computers and portable electronic devices (e.g., mobile communications devices, smartphones, tablet computers, laptops) such as the Samsung Galaxy Tab®, Google Nexus devices, Amazon Kindle®, Kindle Fire®, Apple iPhone®, the Apple iPad®, Microsoft Surface®, the Palm Pre™, or any device running the Apple iOS™, Android™ OS, Google Chrome OS, Symbian OS®, Windows Mobile® OS, Windows Phone, BlackBerry OS, Embedded Linux, webOS, Palm OS® or Palm Web OS™.

One of ordinary skill in the art would appreciate that testing may be required in order to ensure that the applications not only perform according to expectations, but also that they retrieve and generate the same types of data as will be further discussed herein.

In a specific embodiment, a web browser application executing on a client system enables users to select, access, retrieve, and/or query information and/or applications stored by server system 120. Examples of web browsers include the Android browser provided by Google, the Safari® browser provided by Apple, Amazon Silk® provided by Amazon, the Opera Web browser provided by Opera Software, the BlackBerry® browser provided by Research In Motion, the Internet Explorer® and Internet Explorer Mobile browsers provided by Microsoft Corporation, the Firefox® and Firefox for Mobile browsers provided by Mozilla®, Google Chrome, and the like.

Figure 2:
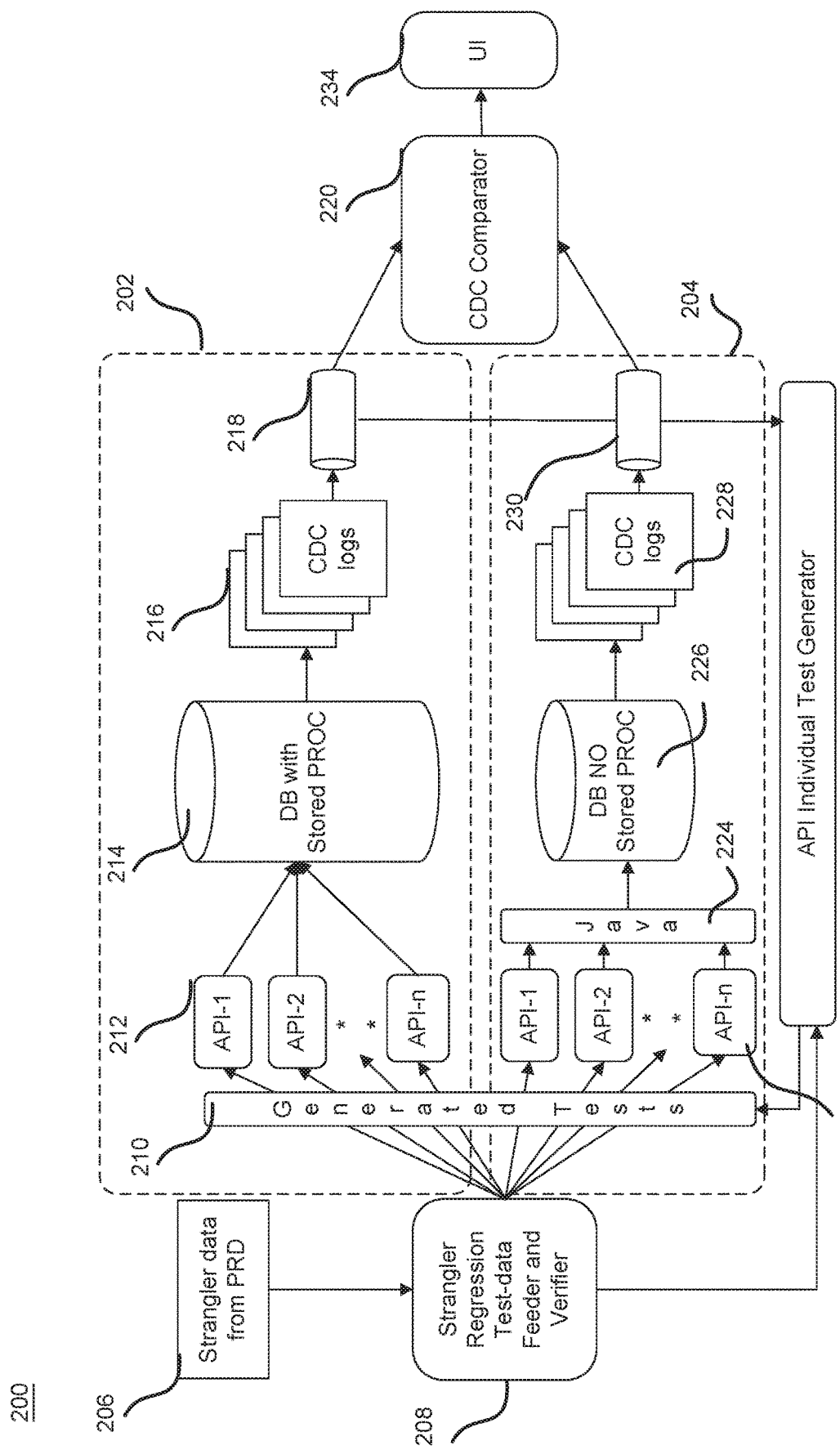
FIG. 2 illustrates a system flow for performance testing between computing environments, according to some embodiments.

FIG. 2 illustrates a system flow 200 for performance testing between two computing environments—computing environment 202 and computing environment 204. While two computing environments are illustrated, it can be understood that two or more environments can be tested in simultaneous fashion for scalability and/or if there are desires to migrate to multiple databases, for example.

Computing environment 202 may be an existing computing environment that is to be updated. It may include any type of database. According to some aspects, computing environment 202 may include a list of one or more application programming interfaces (APIs). In this case, computing environment 202 may include n API's, n>1. In order to establish a proper performance baseline, a three-prong approach may be utilized based on, for example, data creation, environment setup, and testing. The proposed testing environment may be directed at all three phases. For example, initially, the proposed testing targets data creation by capturing data from previous calls, computing environment setup by using captured data, and then testing the environments.

According to some aspects, data creation may be generated based on a strangler pattern. A strangler pattern may be a way of migrating a legacy system incrementally by replacing existing functionalities with new applications and services in a phased approach. According to some aspects, a strangler pattern may include an initial testing phase to generate a baseline of performance for APIs 212. For example, each of APIs 212 may be activated through API calls and a performance measurement may be taken. In some aspects, performance measurements may include measuring inputs and outputs, and created events within database 214. Database 214 may be a database with stored procedures. Stored procedures may be a set of structured query language (SQL) statements with an assigned name, which are stored in a relational database management system (e.g., database 214) as a group, and can be reused and shared by multiple programs/APIs.

Rather than testing each API separately, according to some aspects, all of APIs 212 can be tested at the same time using calls. According to some embodiments, a strangler pattern may be implemented in the testing data creation (e.g., data capture step). The use of the strangler pattern allows for the capture of data by executing APIs within an existing environment—e.g., environment 202, the initial environment where the applications are running. The strangler pattern may be implemented using approaches such as aspect oriented programming and wrappers. In some examples, the data captured may include both input and output data of each tested API. The captured data may then be stored in a repository, e.g., a data store such as a cloud based data store.

According to some embodiments, the stored data is then considered as test data that may comprise inputs and baselined outputs. This may capture, for example, what input metrics were implemented and the expected outputs set as a baseline metric. Upon determination of the baseline metric, the baseline metric may then be used to setup a second environment, e.g., environment 204. According to some embodiments, the input data is fed into the tests and the output of the API(s) being tested is compared with the baselined output. In one example, the input data may be the same input data generated by the strangler pattern that is used to test environment 202. If the outputs match the baselined output, then it may be determined that the API(s) are performing without errors in the new environment. Alternatively, if the test results show discrepancy between the test outputs and the baselined outputs, then this may indicate that the API's are not performing optimally in new environment 204 and further modifications would be necessary. Aspects of the data processing and analysis are further described herein below.

According to some aspects, a change data capture ("CDC") operation may be performed at 216. CDC can capture a plurality of changed data, including time stamps, version numbers, status indicators, triggers on tables, and the like. CDC logs 216 (logging the changes) can be fed into a stream processing software platform, such as Apache Kafka®, or other types of high-throughput, low-latency platforms for handling real-time data feeds.

According to some aspects, stream processing 218 may transmit the data stream of generated CDC logs to a CDC comparator 220 to perform a comparison. Stream processing 218 may also provide the output as an input into API individual test generator 232. API individual test generator 232 may receive, as an input, CDC logs of environment 202, and strangler regression test data 208, and output a pool of generated tests 210 that can be used to test the second environment 204. Accordingly, tests output by API individual test generator can be augmented with CDC log data results of the initial tests. In one embodiment, stream processing 218 may begin by collecting baseline data. According to some aspects, this enables generating a testing setup that is agnostic to the test environment. For example, the data may be initially captured using a Strangler regression such that the input and output of the APIs are captured by running the APIs in a production environment. The Strangler regression may capture a complete workflow (i.e., capturing both input and output API data). In one example, the APIs may be executed in parallel.

According to one embodiment, API individual test generator 232 may initially use test data from strangler regression test data feeder 208 to set up an initial test environment for testing, which may include generating initial test environment parameters that simulate the test environment. API individual test generator 232 may then send the initial test environment parameters to generated tests 210. As may be appreciated, input and output information is needed for any test. As such, setting up input test data may be a prerequisite to run the tests. According to one example, once the initial setup is performed, enhancements/augmentation of the testing data may take place through a feedback loop from stream processing 218 to API individual test generator 232. For example, the data from stream processing 218 may act as a baseline for input and output, and may be used to regenerate the tests at API individual test generator 232. In one example, such augmentation may include preparing the test environment to test certain APIs (e.g., API-5) as will be further described in FIG. 3 below.

Figure 3:
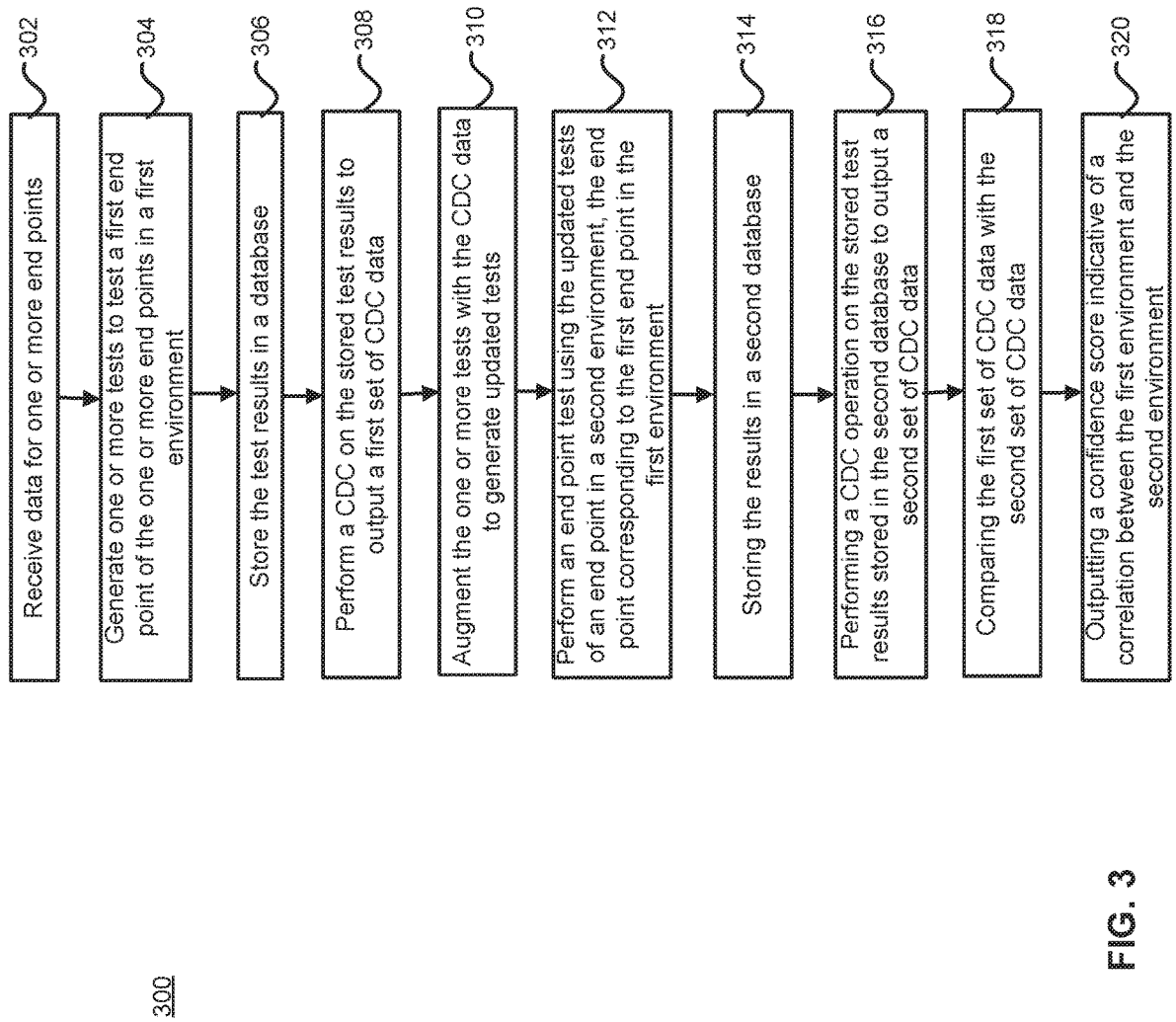
FIG. 3 is a flowchart for testing and validating a new computing environment, according to some embodiments.

FIG. 3 illustrates a flow chart of an example method 300 to test and validate a new computing environment, according to some embodiments. Method 300 may include receiving data for one or more end points, as illustrated in step 302. These end points may be one or more of APIs 214. Method 300 may further include generating one or more tests to test a first end point of the one or more end points in a first environment, as illustrated in step 304. According to some aspects, the one or more tests may be agnostic tests that are independent of the APIs, and may be designed to generate certain input/output combinations that include activation of other parameters, such as events. For example, an API may be called through a test to create an employee name. Accordingly, an input may be an employee name, and a corresponding output may be creation of the employee name in the database. In other words, employee name and prefix may be the input, and the output may be the confirmation that the employee record was created. However, this may be not be a sufficient comparison to validate how an API performs at later stages. Accordingly, tracking of events created in association with the API is also useful. Here, for example, the events may be related to how data points are placed in which tables. For example, two events may have been created in association with this call. A first event relates to creating a record in a first table (e.g. employee name). A second event may relate to creating a record in a second table (e.g., employee prefix). Tracking these events and comparing them at a later time will be relevant for a validation of the API's performance in a new computing environment after a migration operation is performed, for example.

Method 300 may further include storing the test results in a database, as illustrated in step 306. The test results may be stored in database 214 for example. Method 300 may further include performing a CDC on the stored test results to output a first set of CDC data, as illustrated in step 308. Change data capture may be a set of software patterns used to determine and track data that has changed so that actions may be taken using the changed data. CDC may capture state changes to the data. For example, CDC logs may capture input and output values, but may not necessarily capture other events associated with the tests.

Method 300 may further include augmenting the one or more tests with the CDC data to generate updated tests, as illustrated in step 310. This augmentation may allow tests to be constantly updated, in a feedback loop (e.g., back into API individual test generator 232). According to some embodiments, with reference to FIG. 2, the augmentation process may be used in setting up a testing environment in a second environment 204. For example, the output of stream processing 218 includes test results relating to DB 214; the output is then fed into API individual test generator 232 to generate database scripts that enable the system (e.g. server 120) to create an environment that can run tests on API(s) 222. In other words, according to some embodiments, test results of environment 202 may be used to create database scripts to prepare environment 204 for testing. For example, if a test of API-5 of API(s) 222 is needed, database 226 needs to be in the correct state so that running tests on API-5 of 222 will not produce erroneous results. This can be achieved by creating database scripts making use of output from API-1 to API-4. In one example, the input of the API-1 to API-4 in environment 202 may be used to generate database scripts that may include scripts to insert data into a database.

Considering an automobile finance example: API-1 may be an API that creates the Customer Data, and API-4 may create Loan Application. Furthermore, API-5 may be used to approve the loan. For that to happen, customer data and a customer loan application may need to reside in the database so that API-5 can act on that information. Accordingly, outputs of API-1 to API-4 become a prerequisite for API-5. That means that if only API-5 is to be tested, the database should be brought to a state that has information about the customer and loan application. As such, output of API-1 to API-4 may be recorded using CDC logs 216 and fed to stream processing 218. In one example, the output of stream processing 218 may be used to generate database scripts that may be used by API individual test generator 232 to generate tests. In one example, the generated tests may use the scripts to setup the database without having to call API-1 to API-4 whenever API-5 is to be tested. According to one aspect, the process of using the scripts removes the tight coupling between the APIs and makes it possible to test them independently. This also enables test environments to be prepared for testing any selected API without having to pretest any other API that the selected API may depend on, thus reducing environment set up time and computational bandwidth.

According to some aspects, method 300 may further include performing an endpoint test using the updated tests of an endpoint in a second environment, the endpoint corresponding to the first endpoint in the first environment, as illustrated in step 312. Here, the endpoint test can be performed to test the same API (e.g., API 222) in second computing environment 204, for example. According to some aspects, method 300 may further include storing the results in a second database (e.g., database 226), as illustrated in step 314. According to some aspects, database 226 may not require stored procedures. It can be appreciated that the data may be migrated to one or more different computing environments. In one example, DB 214 may include stored procedures while DB 226 does not. This may be an example where the stored procedures are moved and stored in a Java layer of the DB.

According to some aspects, method 300 may further include performing a CDC operation on the stored test results in database 226 and outputting a second set of CDC data, as illustrated in step 316. Method 300 may further include comparing the first set of CDC data with the second set of CDC data, as illustrated in step 318. Method 300 may further include outputting a confidence score indicative of a correlation between the first environment and the second environment, as illustrated in step 320. The confidence score may be generated by CDC comparator 220 and output via UI 234 to a user. According to some aspects, the confidence score may indicate whether an API, or a set of APIs 222 are validated. Validation may indicate that the APIs have performed in the same manner in computing environment 204 as they did in computing environment 202. According to some aspects, the confidence score may be a binary 1 or a 0, 1 indicating full validation, and 0 indicating that the API did not perform in the same manner. In other words, a 0 may indicate that there is a mismatch in the performance, and further configuration of the second computing environment may be necessary.

Figure 4:
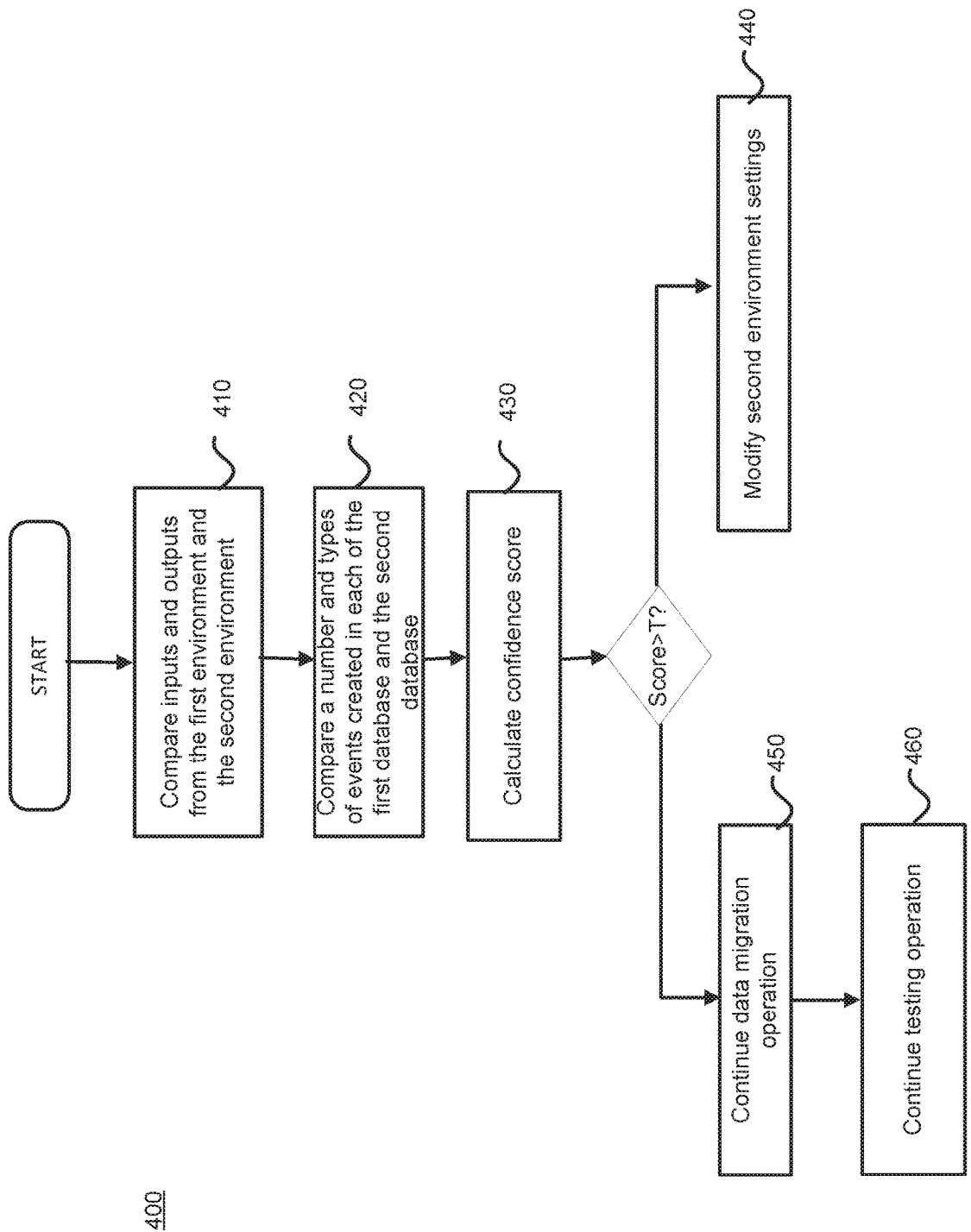
FIG. 4 is a flowchart representing a migration testing method, according to some embodiments.

FIG. 4 illustrates a migration testing method 400, according to some embodiments. Method 400 may include comparing inputs and outputs from the first environment and the second environment, as illustrated in step 410. As noted herein, such comparison may be performed at a comparator, such as, but not limited to CDC comparator 220. The comparison may be for one or more tested APIs in environment 202 with one or more tested APIs in environment 204. The comparison may include comparing a number and type of events created in each of the first database and the second database, as illustrated in step 420. For example, tracking inputs and outputs is a key component to the comparison. However, additionally tracking events created can further reveal whether the new computing environment is properly configured to allow the APIs to perform as they did in the old computing environment.

Method 400 may further include calculating a confidence score, as illustrated in step 430. If the score is above a threshold, then a migration operation is continued, as illustrated in step 450. According to some embodiments, the confidence score may reflect a degree of mismatch between the test results for tests conducted in, for example, environment 202 and environment 204. The degree of mismatch may be based on a few attributes, such as created date and generated identifiers. Additionally, further testing operations may also be carried out, as illustrated in step 460, in order to ensure that all APIs are performing consistently. Testing operations may be continued in situations where the comparison is performed on an API-by-API basis. Other examples may perform comparisons of tests performed for all of the APIs.

According to some embodiments, APIs may be run one at a time (sequentially) or run in parallel. Database scripts may not be needed in the case where APIs are run sequentially. That is because the sequential running of the scripts bring the database to a current state without the need for simulation. However, if parallel testing is performed (e.g., where results from a specific API are desired), then database scripts may be used to bring the database test environment to a prerequisite state (e.g., a state that can properly test an API of interest, such as API-5 in the earlier example).

Moreover, if the confidence score is below a threshold, modifications of the second environment settings may be required, as illustrated in step 440. In one example, a confidence score below the threshold may indicate that the test failed because of a migration related issue. In one example, this may be attributed to Java code not properly executing (i.e., an API not properly executing) as expected. While the example describes the use of Java code, it can be appreciated that other coding languages may also be implemented herein.

Figure 5:
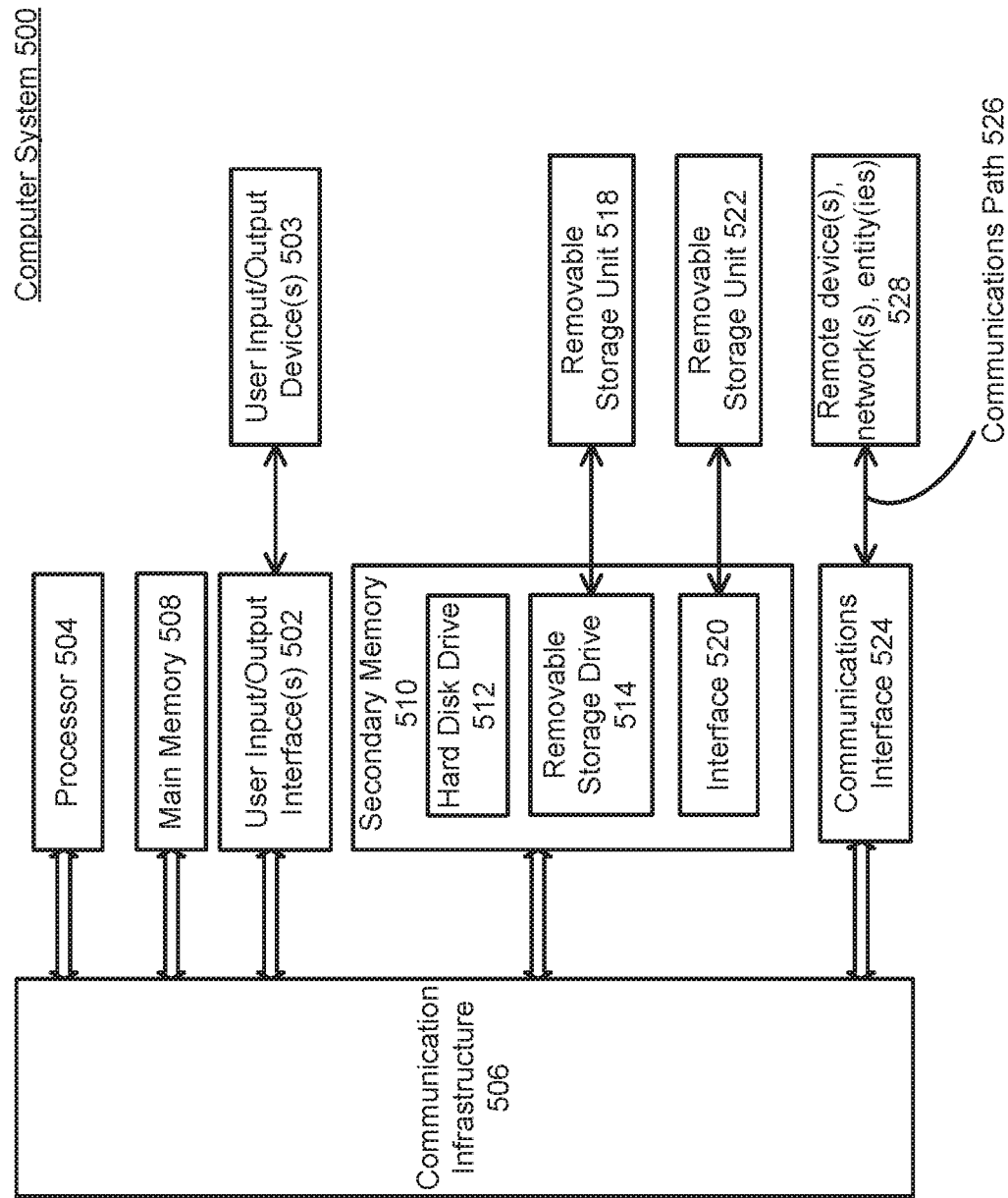
FIG. 5 illustrates a computer system that carries out the migration testing operations in FIGS. 2-4, according to some embodiments.

Various embodiments of the disclosure may be implemented, for example, using one or more well-known computer systems, such as computer system 500 shown in FIG. 5. One or more computer systems 500 may be used, for example, to implement any of the embodiments discussed herein, as well as combinations and sub-combinations thereof.

Computer system 500 may include one or more processors (also called central processing units, or CPUs), such as a processor 504. Processor 504 may be connected to a communication infrastructure or bus 506.

Computer system 500 may also include user input/output device(s) 503, such as monitors, keyboards, pointing devices, etc., which may communicate with communication infrastructure 506 through user input/output interface(s) 502.

One or more of processors 504 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 500 may also include a main or primary memory 508, such as random-access memory (RAM). Main memory 508 may include one or more levels of cache. Main memory 508 may have stored therein control logic (i.e., computer software) and/or data.

Computer system 500 may also include one or more secondary storage devices or memory 510. Secondary memory 510 may include, for example, a hard disk drive 512 and/or a removable storage device or drive 514. Removable storage drive 514 may be a floppy disk drive, a magnetic tape drive, a compact disk drive, an optical storage device, tape backup device, and/or any other storage device/drive.

Removable storage drive 514 may interact with a removable storage unit 618. Removable storage unit 518 may include a computer usable or readable storage device having stored thereon computer software (control logic) and/or data. Removable storage unit 518 may be a floppy disk, magnetic tape, compact disk, DVD, optical storage disk, and/any other computer data storage device. Removable storage drive 514 may read from and/or write to removable storage unit 518.

Secondary memory 510 may include other means, devices, components, instrumentalities or other approaches for allowing computer programs and/or other instructions and/or data to be accessed by computer system 500. Such means, devices, components, instrumentalities or other approaches may include, for example, a removable storage unit 522 and an interface 520. Examples of the removable storage unit 522 and the interface 520 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 500 may further include a communication or network interface 524. Communication interface 524 may enable computer system 500 to communicate and interact with any combination of external devices, external networks, external entities, etc. (individually and collectively referenced by reference number 528). For example, communication interface 524 may allow computer system 500 to communicate with external or remote devices 528 over communications path 526, which may be wired and/or wireless (or a combination thereof), and which may include any combination of LANs, WANs, the Internet, etc. Control logic and/or data may be transmitted to and from computer system 500 via communication path 526.

Computer system 500 may also be any of a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof.

Computer system 500 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 500 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 500, main memory 508, secondary memory 510, and removable storage units 518 and 522, as well as tangible articles of manufacture embodying any combination of the foregoing. Such control logic, when executed by one or more data processing devices (such as computer system 500), may cause such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 5. In particular, embodiments can operate with software, hardware, and/or operating system embodiments other than those described herein.

Descriptions to an embodiment contemplate various combinations, components and sub-components. However, it will be understood that other combinations of the components and sub-components may be possible while still accomplishing the various aims of the present application. As such, the described embodiments are merely examples, of which there may be additional examples falling within the same scope of the disclosure.

What is claimed is:

1. A computer-implemented method for testing software within different environments, the method comprising:
   receiving data for one or more application programming interfaces (APIs);
   generating one or more tests to test a first API of the one or more APIs in a first computing environment;
   testing the first API using the one or more tests to generate a first test result;
   storing the first test result in a database;
   performing a change data capture (CDC) operation on the first test result to output a first set of CDC data;
   augmenting the one or more tests with the CDC data to generate an updated test;
   testing, using the updated test, a second API of the one or more APIs to generate a second test result, the second API operating in a second computing environment, and being equivalent to the first API;
   storing the second test result in a second database;
   performing a CDC operation on the second test result stored in the second database to output a second set of CDC data;
   comparing the first set of CDC data with the second set of CDC data; and
   outputting a confidence score based on the comparison between the first set of CDC data and the second set of CDC data, the confidence score indicating a correlation between the first environment and the second environment.

2. The computer-implemented method of claim 1, wherein the first environment is a SQL computing system environment, and wherein the second environment is a Java computing system environment.

3. The computer-implemented method of claim 1, the comparing further comprising:
   comparing inputs and outputs from the first environment and the second environment, the inputs and outputs including at least one of timestamps, version numbers, or status indicators of database rows; and
   comparing a number and types of events created in each of the first database and the second database.

4. The computer-implemented method of claim 1, further comprising:
   determining that the second environment is not fit to host the one or more APIs in response to the confidence score being below a predetermined threshold; and
   modifying the second environment settings.

5. The computer-implemented method of claim 1, wherein the received data is strangler data representing regression testing on the first environment.

6. The computer-implemented method of claim 1, further comprising:
   merging strangler regression data with the first set of CDC data to produce merged data; and
   feeding the merged data into the second environment.

7. The computer-implemented method of claim 1, further comprising:
   displaying, on a user interface, the confidence score, and, in response to the confidence score being below a predetermined threshold, further displaying a number and type of events created in each of the first database and the second database.

8. The computer-implemented method of claim 7, further comprising:
   providing, on the user interface, a set of instructions to set up the second environment in conformance with the first environment such that the confidence score is above the predetermined threshold.

9. A system comprising:
   one or more processors; and
   one or more memories having instructions stored thereon that, when executed by one or more processors, cause the one or more processors to:
   receive data for one or more application programming interfaces (APIs);
   generate one or more tests to test a first API of the one or more APIs in a first computing environment;
   test the first API using the one or more tests to generate a first test result;
   store the first test result in a database;
   perform a change data capture (CDC) operation on the first test result to output a first set of CDC data;
   augment the one or more tests with the CDC data to generate an updated test;
   test, using the updated test, a second API of the one or more APIs to generate a second test result, the second API operating in a second computing environment, and being equivalent to the first API;
   store the second test result in a second database;
   perform a CDC operation on the second test result stored in the second database to output a second set of CDC data;
   compare the first set of CDC data with the second set of CDC data; and
   output a confidence score based on the comparison between the first set of CDC data and the second set of CDC data, the confidence score indicating a correlation between the first environment and the second environment.

10. The system of claim 9, wherein the first environment is a SQL computing system environment, and wherein the second environment is a Java computing system environment.

11. The system of claim 9, wherein the one or more processors is further configured to:
    compare inputs and outputs from the first environment and the second environment, the inputs and outputs including at least one of timestamps, version numbers, or status indicators of database rows; and
    compare a number and types of events created in each of the first database and the second database.

12. The system of claim 9, wherein the one or more processors are further configured to:
    determine that the second environment is not fit to host the one or more APIs in response to the confidence score being below a predetermined threshold; and
    modify the second environment settings.

13. The system of claim 9, wherein the received data is strangler data representing regression testing on the first environment.

14. The system of claim 9, wherein the one or more processors are further configured to:
    merge strangler regression data with the first set of CDC data to produce merged data; and
    feed the merged data into the second environment.

15. The system of claim 9, wherein the one or more processors are further configured to:
    display, on a user interface, the confidence score, and, display a number and type of events created in each of the first database and the second database in response to the confidence score being below a predetermined threshold.

16. The system of claim 15, wherein the one or more processors are further configured to:
provide, on the user interface, a set of instructions to set up the second environment in conformance with the first environment such that the confidence score is above the predetermined threshold.

17. A non-transitory computer-readable medium including instructions that, when executed by one or more processors, cause the processors to perform a method for testing software within different environments, the method comprising:
receiving data for one or more application programming interfaces (APIs);
generating one or more tests to test a first API of the one or more APIs in a first computing environment;
testing the first API using the one or more tests to generate a first test result;
storing the first test result in a database;
performing a change data capture (CDC) operation on the first test result to output a first set of CDC data;
augmenting the one or more tests with the CDC data to generate an updated test;
testing, using the updated test, a second API of the one or more APIs to generate a second test result, the second API operating in a second computing environment, and being equivalent to the first API;
storing the second test result in a second database;
performing a CDC operation on the second test result stored in the second database to output a second set of CDC data;
comparing the first set of CDC data with the second set of CDC data; and
outputting a confidence score based on the comparison between the first set of CDC data and the second set of CDC data, the confidence score indicating a correlation between the first environment and the second environment.

18. The non-transitory computer-readable medium of claim 17, wherein the first environment is a SQL computing system environment, and wherein the second environment is a Java computing system environment.

19. The non-transitory computer-readable medium of claim 17, wherein the comparing further comprises:
comparing inputs and outputs from the first environment and the second environment, the inputs and outputs including at least one of timestamps, version numbers, or status indicators of database rows; and
comparing a number and types of events created in each of the first database and the second database.

20. The non-transitory computer-readable medium of claim 17, further comprising:
determining that the second environment is not fit to host the one or more APIs in response to the confidence score being below a predetermined threshold; and
modifying the second environment settings.

* * * * *